US009380630B2

(12) United States Patent
Youtz et al.

(10) Patent No.: US 9,380,630 B2
(45) Date of Patent: Jun. 28, 2016

(54) MANAGEMENT OF ACCESS NETWORK RETRY ACROSS POWER CYCLE

(71) Applicant: Cellco Partnership, Basking Ridge, NJ (US)

(72) Inventors: Andrew E. Youtz, Princeton, NJ (US); Christopher M. Schmidt, Branchburg, NJ (US); Lily Zhu, Parsippany, NJ (US); Zhengfang Chen, Millburn, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 226 days.

(21) Appl. No.: 14/063,559

(22) Filed: Oct. 25, 2013

(65) Prior Publication Data

US 2015/0117184 A1 Apr. 30, 2015

(51) Int. Cl.
*H04W 76/02* (2009.01)
*H04W 48/16* (2009.01)
*H04W 48/02* (2009.01)

(52) U.S. Cl.
CPC ............ *H04W 76/027* (2013.01); *H04W 48/16* (2013.01); *H04W 48/02* (2013.01)

(58) Field of Classification Search
None
See application file for complete search history.

(56) References Cited

U.S. PATENT DOCUMENTS

| 2009/0028331 | A1* | 1/2009 | Millar et al. ................. 380/255 |
| 2010/0075658 | A1* | 3/2010 | Hou et al. .................. 455/422.1 |
| 2010/0297979 | A1* | 11/2010 | Watfa et al. ............... 455/404.1 |
| 2012/0178440 | A1* | 7/2012 | Aidee et al. ............... 455/426.1 |
| 2012/0178449 | A1* | 7/2012 | Liao ........................... 455/435.2 |
| 2013/0053103 | A1* | 2/2013 | Kim et al. ...................... 455/561 |
| 2014/0295837 | A1* | 10/2014 | Madasamy ............... 455/435.1 |

FOREIGN PATENT DOCUMENTS

WO WO/2013/137698 * 9/2013

OTHER PUBLICATIONS

3GPP Organizational Partners, "3rd Generation Partnership Project; Technical Specification Group Core Network and Terminals; Non-Access-Stratum (NAS) protocol for Evolved Packet System (EPS); Stage 3 (Release 8)", 3GPP TS 24.301 V8.1.0, Mar. 2009, 250 pages.

* cited by examiner

*Primary Examiner* — Christine Duong

(57) ABSTRACT

A device creates a list of permanent evolved packet system (EPS) mobility management (EMM) failure events associated with the device, where the list includes information associated with one or more permanent EMM failure events encountered by the device. The device stores the list of permanent EMM failure events, provides an attach request message to an access network, and receives, from the access network, a reject message as a response to the attach request message. The device performs a power cycle based on receiving the reject message, and erases, based on the power cycle, a forbidden public land mobile network (PLMN) list and a forbidden tracking area list maintained by the device. The device repopulates the forbidden PLMN list and the forbidden tracking area list with information included in the list of permanent EMM failure events.

20 Claims, 16 Drawing Sheets

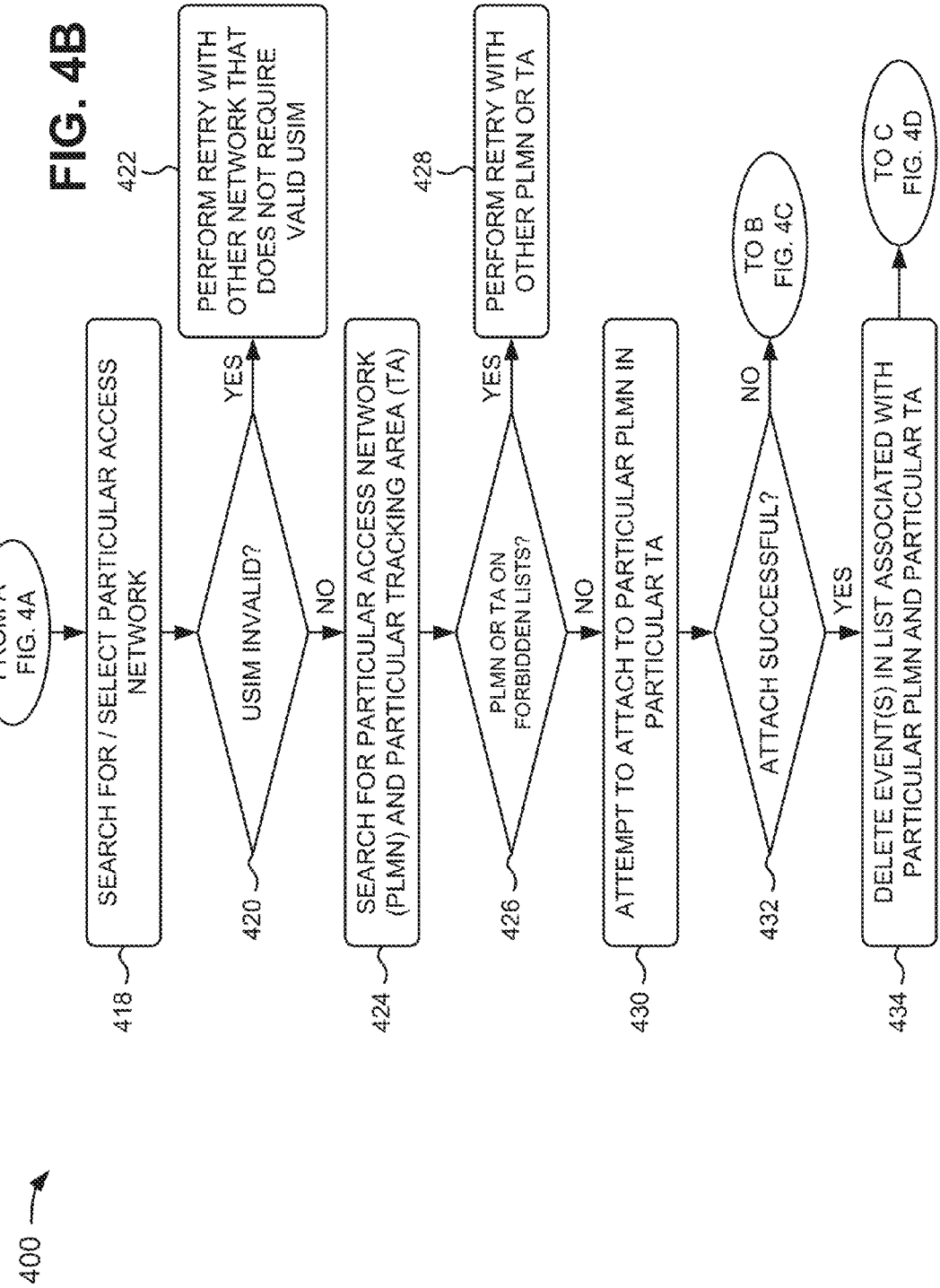

FIG. 5A

LIST OF PERMANENT EMM FAILURE EVENTS (525)

| Date/Time | EMM Code | PLMN ID | TA | Event Counter |
|---|---|---|---|---|
| 1/1/13 – 9 AM | 3 | 123456 | TA1 | 1 |
| 1/1/13 – 10 AM | 6 | 789101 | TA1 | 1 |
| 1/1/13 – 11 AM | 7 | 234567 | TA2 | 2 |
| 1/1/13 – 11 AM | 8 | 448761 | TA3 | 1 |
| 1/1/13 – 12 PM | 11 | 839248 | TA3 | 3 |
| 1/1/13 – 1 PM | 12 | 327805 | TA4 | 1 |
| 1/1/13 – 1 PM | 13 | 017935 | TA5 | 2 |
| 1/1/13 – 2 PM | 14 | 648391 | TA5 | 5 |
| 1/1/13 – 2 PM | 15 | 103847 | TA6 | 4 |
| *** | *** | *** | *** | *** |

FORBIDDEN PLMN LIST 505

FORBIDDEN TA LIST 510

T3402 TIMER 515

EXCESSIVE PDN TIMER 520

LIST OF PERMANENT EMM FAILURE EVENTS (525)

| Date/Time | EMM Code | PLMN ID | TA | Event Counter |
|---|---|---|---|---|
| ~~1/1/13 – 9 AM~~ | ~~3~~ | ~~123456~~ | ~~TA1~~ | ~~1~~ |
| ~~1/1/13 – 10 AM~~ | ~~6~~ | ~~789101~~ | ~~TA1~~ | ~~1~~ |
| ~~1/1/13 – 11 AM~~ | ~~7~~ | ~~234567~~ | ~~TA2~~ | ~~2~~ |
| ~~1/1/13 – 11 AM~~ | ~~8~~ | ~~448764~~ | ~~TA2~~ | ~~1~~ |
| 1/1/13 – 12 PM | 11 | 839248 | TA3 | 3 |
| 1/1/13 – 1 PM | 12 | 327805 | TA4 | 1 |
| 1/1/13 – 1 PM | 13 | 017935 | TA5 | 2 |
| 1/1/13 – 2 PM | 14 | 648391 | TA5 | 5 |
| 1/1/13 – 2 PM | 15 | 103847 | TA6 | 4 |
| *** | *** | *** | *** | *** |

DELETE EVENT(S) > 2 HOURS (540)

LIST OF PERMANENT EMM FAILURE EVENTS (525)

| Date/Time | EMM Code | PLMN ID | TA | Event Counter |
|---|---|---|---|---|
| 1/1/13 – 9 AM | 3 | 123456 | TA1 | 1 |
| 1/1/13 – 10 AM | 6 | 789101 | TA1 | 1 |
| 1/1/13 – 11 AM | 7 | 234567 | TA2 | 2 |
| 1/1/13 – 11 AM | 8 | 448761 | TA3 | 1 |
| 1/1/13 – 12 PM | 11 | 839248 | TA3 | 3 |
| 1/1/13 – 1 PM | 12 | 327805 | TA4 | 1 |
| ~~1/1/13 – 1 PM~~ | ~~13~~ | ~~017935~~ | ~~TA5~~ | ~~2~~ |
| ~~1/1/13 – 2 PM~~ | ~~14~~ | ~~017935~~ | ~~TA5~~ | ~~6~~ |
| ~~1/1/13 – 2 PM~~ | ~~15~~ | ~~017935~~ | ~~TA5~~ | ~~4~~ |
| *** | *** | *** | *** | *** |

DELETE EVENT(S) ASSOC. WITH PLMN / TA (565)

ATTACH SUCCESSFUL

LIST OF PERMANENT EMM
FAILURE EVENTS (525)

| Date/Time | EMM Code | PLMN ID | TA | Event Counter |
|---|---|---|---|---|
| 1/1/13 – 9 AM | 3 | 123456 | TA1 | 1 |
| 1/1/13 – 10 AM | 6 | 789404 | TA1 | 4 |
| 1/1/13 – 11 AM | 7 | 234567 | TA2 | 2 |
| 1/1/13 – 11 AM | 9 | 448764 | TA3 | 4 |
| 1/1/13 – 12 PM | 11 | 839248 | TA3 | 3 |
| 1/1/13 – 1 PM | 12 | 327805 | TA4 | 1 |
| 1/1/13 – 1 PM | 13 | 047935 | TA5 | 2 |
| 1/1/13 – 2 PM | 14 | 047935 | TA5 | 5 |
| 1/1/13 – 2 PM | 15 | 047935 | TA5 | 4 |
| *** | *** | *** | *** | *** |

DELETE EVENT(S)
> 2 HOURS (570)

ATTACH SUCCESSFUL

LIST OF PERMANENT EMM FAILURE EVENTS (525)

| Date/Time | EMM Code | PLMN ID | TA | Event Counter |
|---|---|---|---|---|
| 1/1/13 – 9 AM | 3 | 123456 | TA1 | 1 |
| 1/1/13 – 10 AM | 6 | 789101 | TA1 | 1 |
| 1/1/13 – 11 AM | 7 | 234567 | TA2 | 2 |
| 1/1/13 – 11 AM | 8 | 448761 | TA3 | 1 |
| 1/1/13 – 12 PM | 11 | 839248 | TA3 | 3 |
| 1/1/13 – 1 PM | 12 | 327805 | TA4 | 1 |
| 1/1/13 – 1 PM | 13 | 017935 | TA5 | 3 |
| 1/1/13 – 2 PM | 14 | 017935 | TA5 | 5 |
| 1/1/13 – 2 PM | 15 | 017935 | TA5 | 4 |
| *** | *** | *** | *** | *** |

ADD EVENT OR INCREMENT COUNTER (575)

ATTACH UNSUCCESSFUL

500

MANAGEMENT OF ACCESS NETWORK RETRY ACROSS POWER CYCLE

BACKGROUND

In the Third Generation Partnership Project (3GPP), the fourth generation (4G) cellular network includes a radio access network (e.g., referred to as a long term evolution (LTE) network) and a wireless core network (e.g., referred to as an evolved packet core (EPC) network). The LTE network is often called an evolved universal terrestrial radio access network (E-UTRAN). The EPC network is an Internet protocol (IP) packet-switched core network that supports high-speed wireless and wireline broadband access technologies. The EPC network allows user equipment (UEs) to access various services by connecting to the LTE network, an evolved high rate packet data (eHRPD) radio access network (RAN), and/or a wireless local area network (WLAN) RAN. The EPC network is a complex system that includes a number of network nodes that communicate with each other when UEs are accessing the EPC network. An evolved packet system (EPS) is defined to include both the LTE and EPC networks. EPS seeks to improve mobile technology through higher bandwidth, better spectrum efficiency, wider coverage, enhanced security, and full interworking with other access networks.

A UE may fail to connect to a RAN due to a variety of events, such as, for example, network resource or bandwidth exhaustion, connection issues, etc. When the UE fails to connect to the RAN, the UE may perform retry procedures that control the frequency of connection or attach attempts to the RAN. During the retry procedures, the UE may power cycle or reset (e.g., power off and on), which may clear retry throttling timers and/or forbidden RAN (e.g., a public land mobile network (PLMN)) and tracking area lists. Without the retry throttling timers and/or the forbidden PLMN and tracking area lists, the UE may attempt to connect to the RAN numerous times. Such excessive attempts to connect to the RAN may cause overuse of network resources provided in the RAN, which may provide poor user experiences for other UEs connected to the RAN.

BRIEF DESCRIPTION OF THE DRAWINGS

FIGS. 4A-4D provide a flow chart of an example process for maintaining timers and a list of permanent EPS mobility management (EMM) failure events during a power cycle of a UE; and FIGS. 5A-5I are diagrams of an example relating to the example process shown in FIGS. 4A-4D.

DETAILED DESCRIPTION OF PREFERRED EMBODIMENTS

The following detailed description refers to the accompanying drawings. The same reference numbers in different drawings may identify the same or similar elements.

Figure 1:
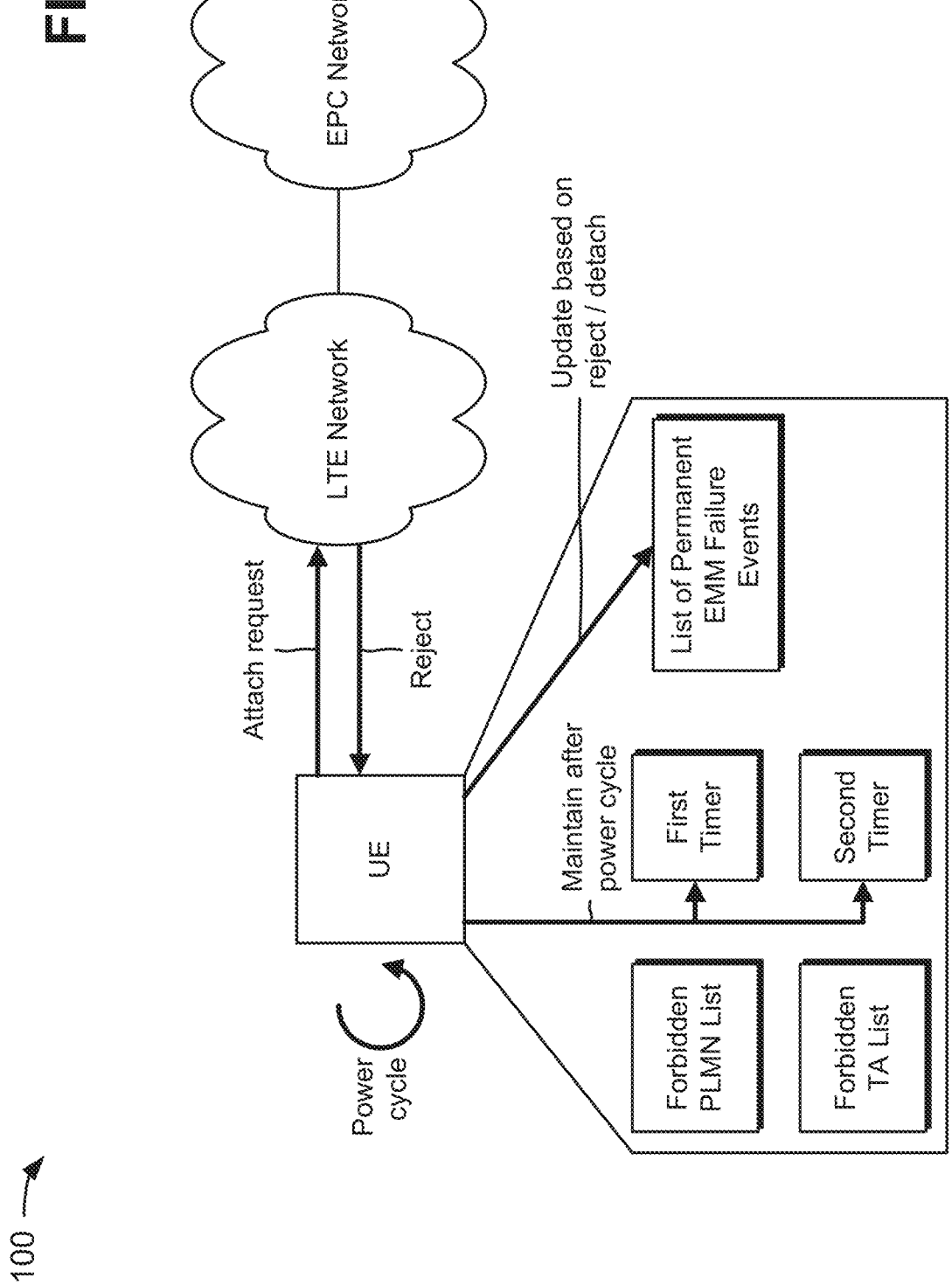
FIG. 1 is a diagram of an overview of an example implementation described herein.

FIG. 1 is a diagram of an overview of an example implementation 100 described herein. As shown, a UE may connect to an EPC network via an LTE network. As further shown in FIG. 1, the UE may maintain a forbidden PLMN list, a forbidden tracking area (TA) list, a first retry throttling timer, and a second retry throttling timer. The forbidden PLMN list may include a list of PLMNs (e.g., RANs, such as LTE networks) to which the UE is not permitted to connect. The forbidden TA list may include a list of TAs to which the UE is not permitted to connect. The first retry throttling timer may include a timer that is started when a TA attach request failure occurs or when a particular number of TA attach request failures occurs. The first retry throttling timer may prevent the UE from sending excessive TA attach requests to particular TA(s). The second retry throttling timer may include a timer that is started when a PDN connection request failure occurs or when a particular number of PDN connection request failures occurs. The second retry throttling timer may prevent the UE from sending excessive PDN connection requests to particular PDN(s).

As further shown in FIG. 1, the UE may maintain another list in addition to the forbidden PLMN list and the forbidden TA list. The other list may include a list of permanent EMM failure events. The list of permanent EMM failure events may include a list of permanent EMM failure events (e.g., attach request failures) associated with the UE, PLMNs, TAs, etc. For example, the permanent EMM failure events may be due to an illegal UE, a forbidden PLMN, a forbidden TA, no roaming being permitted in a TA, no EPS services being permitted in a PLMN, etc. The list of permanent EMM failure events may include dates and times associated with the permanent EMM failure events; permanent EMM failure cause codes for the permanent EMM failure events; PLMN identifiers associated with the permanent EMM failure events; TA identifiers associated with the permanent EMM failure events; a counter for a number of occurrences associated with each permanent EMM failure event; etc.

As further shown in FIG. 1, the UE may attempt to connect to the LTE network by providing an attach request to the LTE network. In example implementation 100, assume that the UE is denied the connection to the LTE network due to a reject message, such as an attach reject message, a tracking area update reject message, a service reject message, a detach request, etc. When the UE receives the reject message, the UE may power cycle, which may cause the UE to erase the forbidden PLMN list and the forbidden TA list. In some implementations, the UE may clear an invalid status of a universal subscriber identity module (USIM) provided in the UE when the UE power cycles.

In some implementations and unlike other arrangements, the UE may maintain the first retry throttling timer and the second retry throttling timer after the UE power cycles. As further shown in FIG. 1, the UE may not clear the list of permanent EMM failure events after the UE power cycles. Rather, the UE may update the list of permanent EMM failure events based on the reject message. The UE may utilize the list of permanent EMM failure events to repopulate the erased forbidden PLMN list and the erased forbidden TA list. In some implementations, the UE may utilize the list of permanent EMM failure events to repopulate the forbidden PLMN and TA lists, before the UE selects a new LTE network, if a permanent failure event has been encountered more than a particular amount of times in a particular time period. In some implementations, the UE may utilize the list of permanent EMM failure events to change a status of the USIM to invalid, before the UE selects a new LTE network, if a permanent failure event has been encountered more than the particular amount of times in the particular time period.

By repopulating the forbidden PLMN and TA lists, by maintaining the retry throttling timers, and by changing the status of the USIM, the UE may not provide excessive attach requests to a LTE network. This may prevent the UE from over-utilizing network resources in the LTE network, which may ensure good user experiences for other UEs connected to the LTE network.

Figure 2:
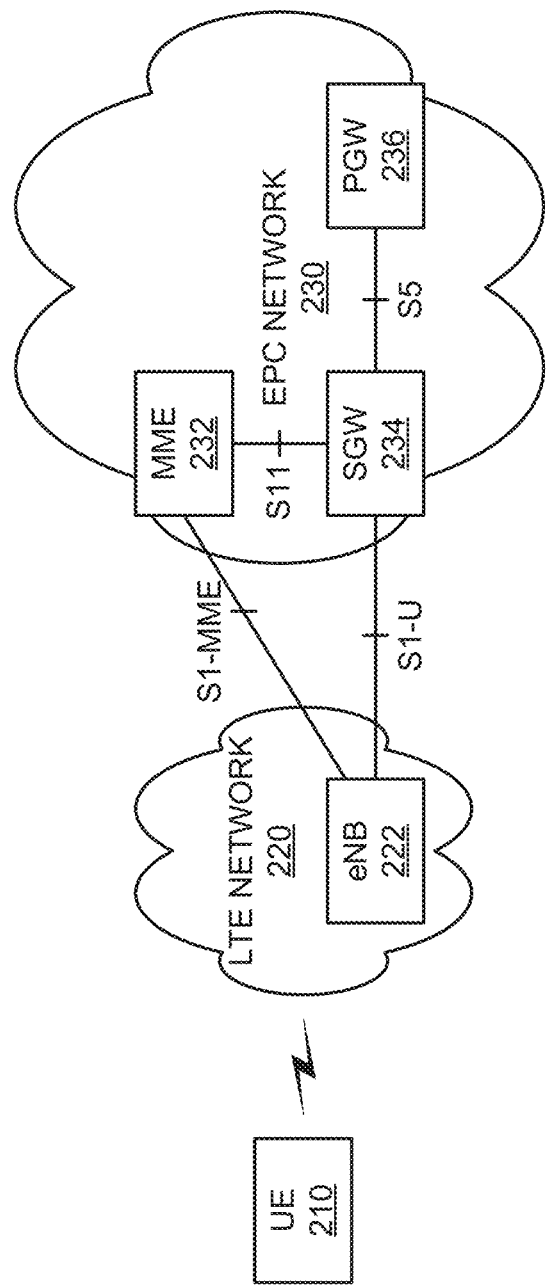
FIG. 2 is a diagram of an example environment in which systems and/or methods described herein may be implemented.

FIG. 2 is a diagram of an example environment 200 in which systems and/or methods described herein may be implemented. As illustrated, environment 200 may include a UE 210, a LTE network 220, and an EPC network 230. LTE network 220 may include an eNodeB (eNB) 222. EPC network 230 may include a mobility management entity (MME) 232, a serving gateway (SGW) 234, and a packet data network (PDN) gateway (PGW) 236. Devices/networks of environment 200 may interconnect via wired connections, wireless connections, or a combination of wired and wireless connections.

As further shown in FIG. 2, eNB 222 may connect with MME 232 over a S1-MME interface, and may connect with SGW 234 over a S1-U interface. MME 232 may connect with SGW 234 over a S11 interface. SGW 234 may connect with PGW 236 over a S5 interface. Other connections not shown in FIG. 2 may also be utilized by devices of LTE network 220 and/or EPC network 230. For example, multiple MMEs 232 may connect with one another over S10 interfaces.

UE 210 may include a device that is capable of communicating over LTE network 220 and/or EPC network 230. In some implementations, UE 210 may include a radiotelephone; a PCS terminal that may combine, for example, a cellular radiotelephone with data processing and data communications capabilities; a smart phone; a PDA that can include a radiotelephone, a pager, Internet/intranet access, etc.; a laptop computer; a tablet computer; a desktop computer; a workstation computer; a personal computer; a landline telephone; a machine-to-machine (M2M) device; or another type of computation and communication device.

LTE network 220 may include a communications network that connects subscribers (e.g., UE 210) to a service provider. In one example, LTE network 220 may include a wireless local area network (WLAN) or other access networks (e.g., an E-UTRAN or an enhanced high-rate packet data (eHRPD) network). In some implementations, LTE network 220 may include a radio access network capable of providing a particular data rate, a particular latency, packet optimization, a particular capacity and coverage, etc.

eNB 222 may include one or more computation and communication devices, such as a base station, that receive traffic from MME 232 and/or SGW 234 and transmit that traffic to UE 210. eNB 222 may also include one or more devices that receive traffic from UE 210 and transmit that traffic to MME 232 and/or SGW 234 or to other UEs 210. eNB 222 may combine the functionalities of a base station and a radio network controller (RNC) in 2G or 3G radio access networks.

EPC network 230 may include a core network architecture of the 3GPP LTE wireless communication standard. In some implementations, EPC network 230 may include an IP packet-switched core network that supports high-speed wireless and wireline broadband access technologies. In some implementations, EPC network 230 may provide packet-switched voice services (e.g., which are traditionally circuit-switched) using an IP Multimedia Subsystem (IMS) network.

MME 232 may include one or more computation and communication devices that may be responsible for idle mode tracking and paging procedures (e.g., including retransmissions) for UE 210. MME 232 may be involved in a bearer activation/deactivation process (e.g., for UE 210) and may choose a SGW for UE 210 at an initial attach and at a time of intra-LTE handover. MME 232 may authenticate UE 210.

Non-access stratum (NAS) signaling may terminate at MME 232 and MME 232 may generate and allocate temporary identities to UEs (e.g., UE 210). MME 232 may check authorization of UE 210 to utilize a service provider's PLMN and may enforce roaming restrictions for UE 210. MME 232 may be a termination point in EPC network 230 for ciphering/integrity protection for NAS signaling and may handle security key management. MME 232 may provide a control plane function for mobility between LTE and access networks with a S3 interface terminating at MME 232.

SGW 234 may route and forward user data packets, may act as a mobility anchor for a user plane during inter-eNB handovers, and may act as an anchor for mobility between LTE and other 3GPP technologies. For idle state UEs 210, SGW 234 may terminate a downlink data path and may trigger paging when downlink data arrives for UE 210. SGW 234 may manage and store contexts associated with UE 210 (e.g., parameters of an IP bearer service, network internal routing information, etc.). In some implementations, SGW 234 may include one or more traffic transfer devices (or network devices), such as a gateway, a router, a switch, a firewall, a network interface card (NIC), a hub, a bridge, a proxy server, an optical add-drop multiplexer (OADM), or some other type of device that processes and/or transfers traffic.

PGW 236 may provide connectivity of UE 210 to external packet data networks by being a traffic exit/entry point for UE 210. UE 210 may simultaneously connect to more than one PGW for accessing multiple PDNs. PGW 236 may perform policy enforcement, packet filtering for each user, charging support, lawful intercept, and packet screening. PGW 236 may also act as an anchor for mobility between 3GPP and non-3GPP technologies. In some implementations, PGW 236 may include one or more traffic transfer devices (or network devices), such as a gateway, a router, a switch, a firewall, a NIC, a hub, a bridge, a proxy server, an OADM, or some other type of device that processes and/or transfers traffic.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
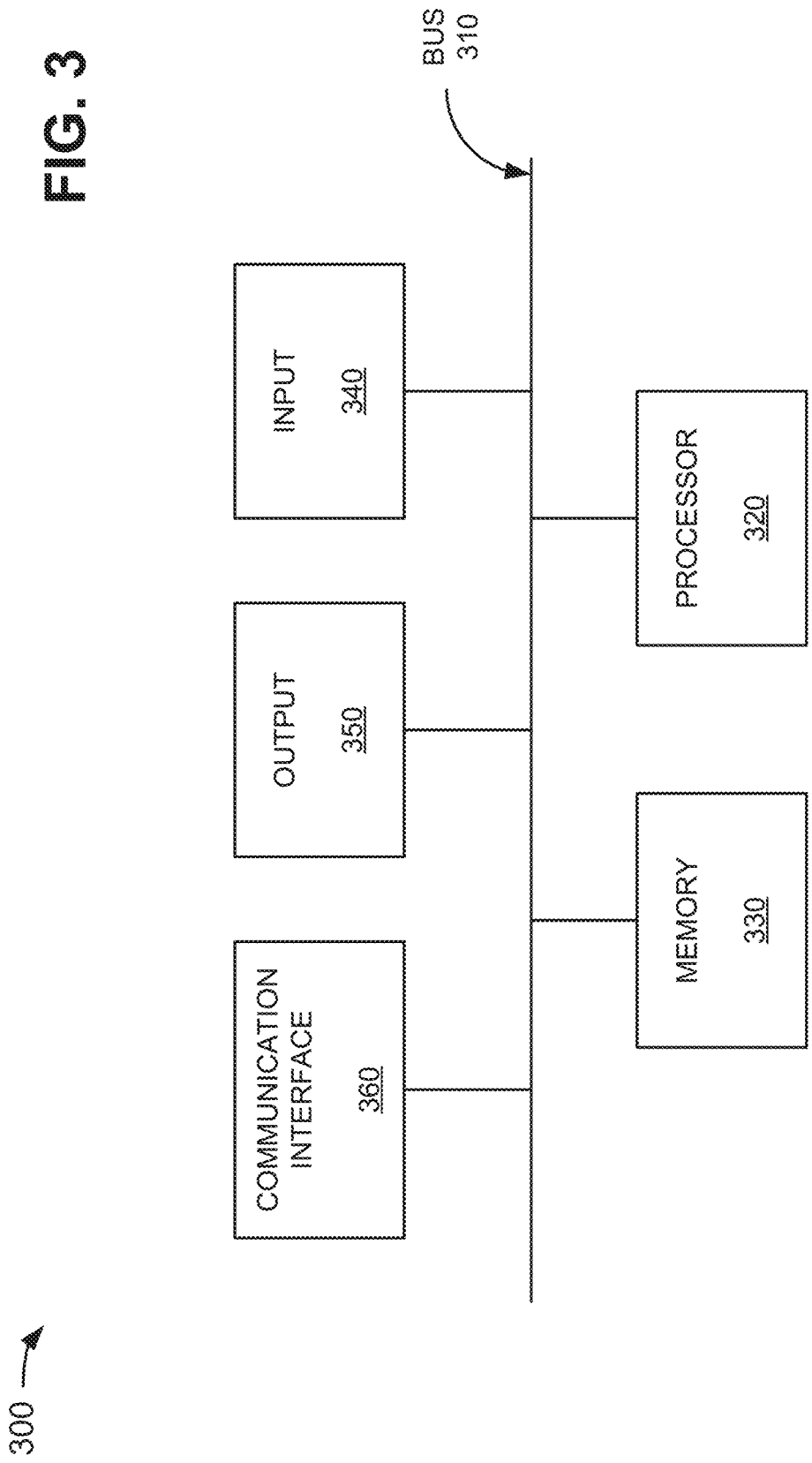
FIG. 3 is a diagram of example components of a device that may correspond to one or more of the devices of the environment depicted in FIG. 2.

FIG. 3 is a diagram of example components of a device 300 that may correspond to one or more of the devices of environment 200. In some implementation, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing.

Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIGS. 4A-4D provide a flow chart of an example process 400 for maintaining timers and a list of permanent EMM failure events during a power cycle of a UE. In some implementations, one or more process blocks of FIG. 4 may be performed by UE 210. In some implementations, one or more process blocks of FIG. 4 may be performed by another device or a group of devices separate from or including UE 210.

As shown in FIG. 4A, process 400 may include creating and storing a list of permanent EMM failure events associated with a device (block 402). For example, UE 210 may attempt to connect to LTE network 220 at various times, and may be denied connection to LTE network 220 based on various permanent EMM failure events (e.g., an illegal UE that is not permitted to connect to a PLMN or tracking area, a PLMN to which the UE is forbidden to connect, a tracking area to which the UE is forbidden to connect, etc.). In some implementations, when the EMM failure events occur, UE 210 may create a list of permanent EMM failure events, and may store information associated with the various permanent EMM failure events in the list. In some implementations, the list of permanent EMM failure events may include date and time information associated with the events; permanent EMM failure cause codes associated with the events; PLMN identifiers associated with the events; tracking area identifiers associated with the events; event counters identifying a number of times the events are encountered; and/or other information that may be useful in tracking EMM failure events.

In some implementations, each of the permanent EMM failure cause codes may include a numeric code that is associated with a particular EMM failure event. For example, the permanent EMM failure cause codes may include the following:

| EMN Failure Cause Code | Description |
| --- | --- |
| 3 | Illegal UE |
| 6 | Illegal Management Entity (ME) |
| 7 | EPS services not allowed |
| 8 | EPS services and non-EPS services not allowed |
| 11 | PLMN not allowed |
| 12 | Tracking area not allowed |
| 13 | Roaming not allowed in this tracking area |
| 14 | EPS services not allowed in this PLMN |
| 15 | No suitable cells in tracking area |

In some implementations, the permanent EMM failure cause codes may include fewer codes, different codes, or additional codes than listed above.

In some implementations, when UE 210 receives a particular permanent EMM failure event associated with a particular PLMN or with a particular PLMN and tracking area, UE 210 may determine whether the particular permanent EMM failure event is associated with any of the EMM failure cause codes. If UE 210 determines that the particular permanent EMM failure event is associated with any of the EMM failure cause codes may determine whether the particular permanent EMM failure event is included in the list of permanent EMM failure events. If UE 210 determines that the particular permanent EMM failure event is included in the list of permanent EMM failure events, UE 210 may increment an event counter for the particular permanent EMM failure event. If UE 210 determines that the particular permanent EMM failure event is not included in the list of permanent EMM failure events, UE 210 may add the particular permanent EMM failure event to the list of permanent EMM failure events and may set the event counter to a particular value, such as one (1).

In some implementations, UE 210 may store the list of permanent EMM failure events in a memory component (e.g., memory 330, FIG. 3) associated with UE 210. In some implementations, UE 210 may maintain (e.g., in persistent memory) and not erase the list of permanent EMM failure events even after a power cycle of UE 210. In some implementations, UE 210 may prevent a user of UE 210 from modifying the list of permanent EMM failure events via a user interface of UE 210 or via a remote access user interface (e.g., for tethered devices).

As further shown in FIG. 4A, process 400 may include receiving a reject or detach message from an access network (block 404). For example, UE 210 may attempt to connect to LTE network 220 by providing an attach request to LTE network 220. In some implementations, LTE network 220 may not permit UE 210 to connect to LTE network 220, and may provide a reject message to UE 210 in response to the attach request. For example, LTE network 220 may provide an attach reject message (e.g., UE 210 may receive this when LTE network 220 denies an attach request), a tracking area update reject message (e.g., UE 210 may receive this when a PLMN denies an attach request), a service reject message (e.g., UE 210 may receive this when LTE network 230 denies a service request), etc. to UE 210 in response to the attach request. In some implementations, UE 210 may be connected to LTE network 220, and LTE network 220 may terminate the connection with UE 210 by providing a detach request to UE 210. In some implementations, the reject message or the detach request may be associated one or more permanent EMM failure events (e.g., an illegal UE, a forbidden PLMN, a forbidden tracking area, etc.).

As further shown in FIG. 4A, process 400 may include performing a power cycle of the device based on the reject or detach message (block 406). For example, when UE 210 receives the detach request or the reject message in response to the attach request, or when triggered by a host or application, UE 210 may perform a power cycle. In some implementations, UE 210 may power off and on in order to perform the power cycle. In some implementations, UE 210 may perform the power cycle in order to re-attempt a connection with LTE network 220. In some implementations, UE 210 may maintain a forbidden PLMN list and a forbidden TA list. The forbidden PLMN list may include a list of PLMNs (e.g., RANs, such as LTE network 220) to which UE 210 is not permitted to connect. The forbidden TA list may include a list of TAs to which UE 210 is not permitted to connect. In some implementations, UE 210 may delete the forbidden PLMN list and the forbidden TA list when UE 210 performs the power cycle.

As further shown in FIG. 4A, process 400 may include maintaining particular timers of the device after the power cycle of the device (block 408). For example, UE 210 may maintain one or more retry throttling timers, such as, for example, a T3402 timer and an excessive PDN request timer. In some implementations, the T3402 timer may include a timer that is started when a TA attach request failure occurs or when a particular number of TA attach request failures occurs. The T3402 timer may prevent UE 210 from sending excessive TA attach requests to particular TA(s). In some implementations, UE 210 may select a cell in a PLMN, and the cell may be in a specific TA. UE 210 may send an attach request to attach to the PLMN. If the specific TA is forbidden, UE 210 may not send the attach request to the PLMN unless UE 210 can reselect a cell in a non-forbidden TA. In some implementations, the excessive PDN request timer may include a timer that is started when a PDN connection request failure occurs or when a particular number of PDN connection request failures occurs. The excessive PDN request timer may prevent UE 210 from sending excessive PDN connection requests to particular PDN(s).

In some implementations, UE 210 may maintain the T3402 timer and the excessive PDN request timer after UE 210 performs the power cycle. For example, UE 210 may maintain the T3402 timer for a particular PLMN as follows. Assume that t1 is a time remaining for a T3402 timeout for the particular PLMN when UE 210 is turned off, and that t is a time elapsed between when UE 210 is turned off and turned on. If t1 is greater than t, UE 210 may restart the T3402 timer, for the particular PLMN, with a value of t1−t. If t1 is less than or equal to t, UE 210 may not restart the T3402 timer for the particular PLMN. If UE 210 is unable to determine t, UE 210 may restart the T3402 timer, for the particular PLMN, with a value of t1.

In some implementations, UE 210 may maintain the excessive PDN request timer for a particular PDN as follows. Assume that t1 is a time remaining for an excessive PDN request timeout for the particular PDN when UE 210 is turned off, and that t is a time elapsed between when UE 210 is turned off and turned on. If t1 is greater than t, UE 210 may restart the excessive PDN request timer, for the particular PDN, with a value of t1−t. If t1 is less than or equal to t, UE 210 may not restart the excessive PDN request timer for the particular PDN. If UE 210 is unable to determine t, UE 210 may restart the excessive PDN request timer, for the particular PDN, with a value of t1.

As further shown in FIG. 4A, process 400 may include determining whether particular event(s) in the list of permanent EMM failure events are older than a time threshold (block 410). For example, after UE 210 performs the power cycle, UE 210 may determine whether any events in the list of permanent EMM failure events are older than a time threshold. In some implementations, the time threshold may include a particular number of hours (e.g., one hour, two hours, etc.), minutes (e.g., forty minutes, fifty minutes, etc.), seconds (e.g., thirty seconds, sixty seconds, etc.), etc. In some implementations, UE 210 may determine ages of the events in the list of permanent EMM failure events based on the date and time information associated with the events. UE 210 may compare the ages of the events to the time threshold when determining whether any of the events are older than the time threshold.

As further shown in FIG. 4A, if particular event(s) in the list of permanent EMM failure events are older than the time threshold (block 410—YES), process 400 may include deleting the event(s) that are older than the time threshold (block 412). For example, when UE 210 determines that one or more events in the list of permanent EMM failure events are older than the time threshold, UE 210 may delete the one or more events from the list. In some implementations, UE 210 may delete the one or more events from the list of permanent EMM failure events prior to initiating selection of a RAN (e.g., LTE network 220). In some implementations, if a universal integrated circuit card (UICC) of UE 210 is replaced, UE 210 may delete, from the list of permanent EMM failure events, all events associated with particular EMM failure cause codes (e.g., EMM failure cause codes 3, 6, 7, or 8). In some implementations, a permanent EMM failure event may be subscriber driven (e.g., a subscriber is not provisioned for service). As a result, if the UICC of UE 210 is replaced (e.g., a different USIM for presumably a different subscriber). UE 210 may clear the entire list of permanent EMM failure events.

As further shown in FIG. 4A, if particular event(s) in the list of permanent EMM failure events are not older than the time threshold (block 410—NO), process 400 may include determining whether event counter(s) associated with the particular event(s) are greater than or equal to a counter threshold (block 414). For example, if UE 210 determines that one or more events in the list of permanent EMM failure events are not older than the time threshold, UE 210 may determine whether event counter(s) associated with the one or more events are greater than or equal to a counter threshold. In some implementations, the counter threshold may include a particular number, such as, for example, two, three, four, etc. UE 210 may compare the event counter(s), provided in the list of permanent EMM failure events, with the particular number when determining whether the event counter(s) are greater than or equal to the counter threshold.

As further shown in FIG. 4A, if event counter(s) associated with the particular event(s) are greater than or equal to the counter threshold (block 414—YES), process 400 may include declaring a USIM of the device invalid, adding PLMN(s) to a forbidden PLMN list, and/or adding TA(s) to a forbidden TA list based on event type(s) associated with the particular event(s) (block 416). For example, when UE 210 determines that event counter(s) associated with the particular event(s) are greater than or equal to the counter threshold, UE 210 may declare a USIM of UE 210 invalid if the particular event(s) are associated with a first set of EMM failure cause codes, such as EMM failure cause codes 3, 6, 7, or 8. In some implementations, when UE 210 determines that event counter(s) associated with the particular event(s) are greater than or equal to the counter threshold, UE 210 may identify PLMN(s) associated with the particular event(s) if the particular event(s) are associated with a second set of EMM failure cause codes, such as EMM failure cause codes 11 or 14. UE 210 may store information associated with the identified PLMN(s) in the forbidden PLMN list. In some implementations, when UE 210 determines that event counter(s) associated with the particular event(s) are greater than or equal to the counter threshold, UE 210 may identify tracking area(s) associated with the particular event(s) if the particular event(s) are associated with a third set of EMM failure cause codes, such as EMM failure cause codes 12, 13, or 15. UE 210 may store information associated with the identified tracking area(s) in the forbidden tracking area list.

In some implementations, UE 210 may declare the USIM of UE 210 invalid, may store the information associated with the identified PLMN(s) in the forbidden PLMN list, and/or may store the information associated with the identified tracking area(s) in the forbidden tracking area list prior to initiating selection of a RAN (e.g., LTE network 220).

As shown in FIGS. 4A and 4B, if event counter(s) associated with the particular event(s) are not greater than or equal to the counter threshold (block 414—NO), process 400 may include searching for and selecting a particular access network (block 418). For example, when UE 210 determines that event counter(s) associated with the particular event(s) are less than the counter threshold, UE 210 may begin to search for access networks to which to attach. In some implementations, UE 210 may select a particular access network (e.g., LTE network 220) based on the search for access networks. For example, UE 210 may identify multiple access networks based on signals received from the multiple access networks. UE 210 may select, from the multiple access networks, an access network meeting a particular criterion (e.g., strongest signal strength, largest bandwidth, closest geographical location, etc.), as the particular access network. In some implementations, when UE 210 determines that event counter(s) associated with the particular event(s) are less than the counter threshold, UE 210 may take no further action with respect to the list of permanent EMM failure events.

As further shown in FIG. 4B, process 400 may include determining whether the USIM of the device is invalid for the particular access network (block 420). For example, after UE 210 selects the particular access network, UE 210 may determine whether the USIM of UE 210 is invalid for the particular access network. In some implementations. UE 210 may determine whether the USIM of UE 210 may be used with the particular access network (e.g., LTE network 220). For example, the USIM of UE 210 may be invalid for the particular access network when the particular access network is not provided by a service provider subscribed to by UE 210. The USIM of UE 210 may be valid for the particular access network when the particular access network is provided by a service provider subscribed to by UE 210.

As further shown in FIG. 4B, if the USIM of the device is invalid for the particular access network (block 420—YES), process 400 may include performing retry procedures with another access network (block 422). For example, if UE 210 determines that the USIM is invalid for the particular access network, UE 210 may select another access network from the identified multiple access networks. In some implementations, UE 210 may perform retry procedures with the other access network. For example, UE 210 may determine whether the USIM is valid for the other access network. In some implementations, the USIM and a validity status of the USIM may be inapplicable for certain air interface technologies, such as, for example, HRPD, single carrier Radio Transmission Technology (1×RTT), WiFi, etc.

As further shown in FIG. 4B, if the USIM of the device is not invalid for the particular access network (block 420—NO), process 400 may include search for the particular access network (e.g., a PLMN) and a particular tracking area (block 424). For example, if UE 210 determines that the USIM is valid for the particular access network (e.g., PLMN), UE 210 may search for the particular PLMN and a particular tracking area associated with the particular PLMN. In some implementations, after selecting the particular PLMN, UE 210 may utilize cell selection for fast cell searching. In some implementations, UE 210 may select a cell in a most preferred, available system and/or network indicated by system selection.

As further shown in FIG. 4B, process 400 may include determining whether the particular PLMN in the particular tracking area is on the forbidden PLMN or tracking area lists (block 426). For example, UE 210 may determine whether the particular PLMN is on the forbidden PLMN list maintained by UE 210. In some implementations, UE 210 may compare a PLMN identifier of the particular PLMN with PLMN identifiers, provided in the forbidden PLMN list, to determine whether the particular PLMN is on the forbidden PLMN list. In some implementations, UE 210 may determine whether the particular tracking area is on the forbidden tracking area list maintained by UE 210. For example, UE 210 may compare a tracking area identifier of the particular tracking area with tracking area identifiers, provided in the forbidden tracking area list, to determine whether the particular tracking area is on the forbidden tracking area list.

As further shown in FIG. 4B, if the particular PLMN in the particular tracking area is on the forbidden PLMN or tracking area lists (block 426—YES), process 400 may include performing retry procedures with another PLMN or tracking area (block 428). For example, if UE 210 determines that the particular PLMN is on the forbidden PLMN list, UE 210 may select another access network (e.g., PLMN) from the identified multiple access networks. In some implementations, UE 210 may perform retry procedures with the other PLMN. For example, UE 210 may determine whether the other PLMN is on the forbidden PLMN list. In some implementations, if UE 210 determines that the particular tracking area is on the forbidden tracking area list, UE 210 may select another tracking area associated with the particular PLMN or the other PLMN. In some implementations, UE 210 may perform retry procedures with the other tracking area. For example, UE 210 may determine whether the other tracking area is on the forbidden tracking area list.

As further shown in FIG. 4B, if the particular PLMN and the particular tracking area are not on the forbidden PLMN list or tracking area lists (block 426—NO), process 400 may include attempting to attach to the particular PLMN in the particular tracking area (block 430). For example, if UE 210 determines that the particular PLMN is not on the forbidden PLMN list and that the particular tracking area is not on the forbidden tracking area list, UE 210 may attempt to attach to the particular PLMN in the particular tracking area. In some implementations, UE 210 may generate an attach request message and may provide the attach request message to the particular PLMN and the particular tracking area.

As further shown in FIG. 4B, process 400 may include determining whether the attempt to attach to the particular PLMN in the particular tracking area is successful (block 432). For example, UE 210 may determine whether the attempt to attach to the particular PLMN in the particular tracking area is successful. In some implementations, UE 210 may determine whether the attempt to attach to the particular PLMN in the particular tracking area is successful based on a message received from the particular PLMN and/or the particular tracking area in response to the attach request message.

As further shown in FIG. 4B, if the attempt to attach to the particular PLMN in the particular tracking area is successful (block 432—YES), process 400 may include deleting event(s), in the list of permanent EMM failure events, associated with the particular PLMN and the particular tracking area (block 434) and continuing to block 448 of FIG. 4D (described below). For example, UE 210 may receive, from the particular PLMN in the particular tracking area, an attach success message in response to the attach request message. When UE 210 receives the attach success message, UE 210 may attach to the particular PLMN in the particular tracking area. In some implementations, when UE 210 receives the attach success message, UE 210 may delete one or more events, in the list of permanent EMM failure events, associated with the particular PLMN and the particular tracking area.

Figure 4C:
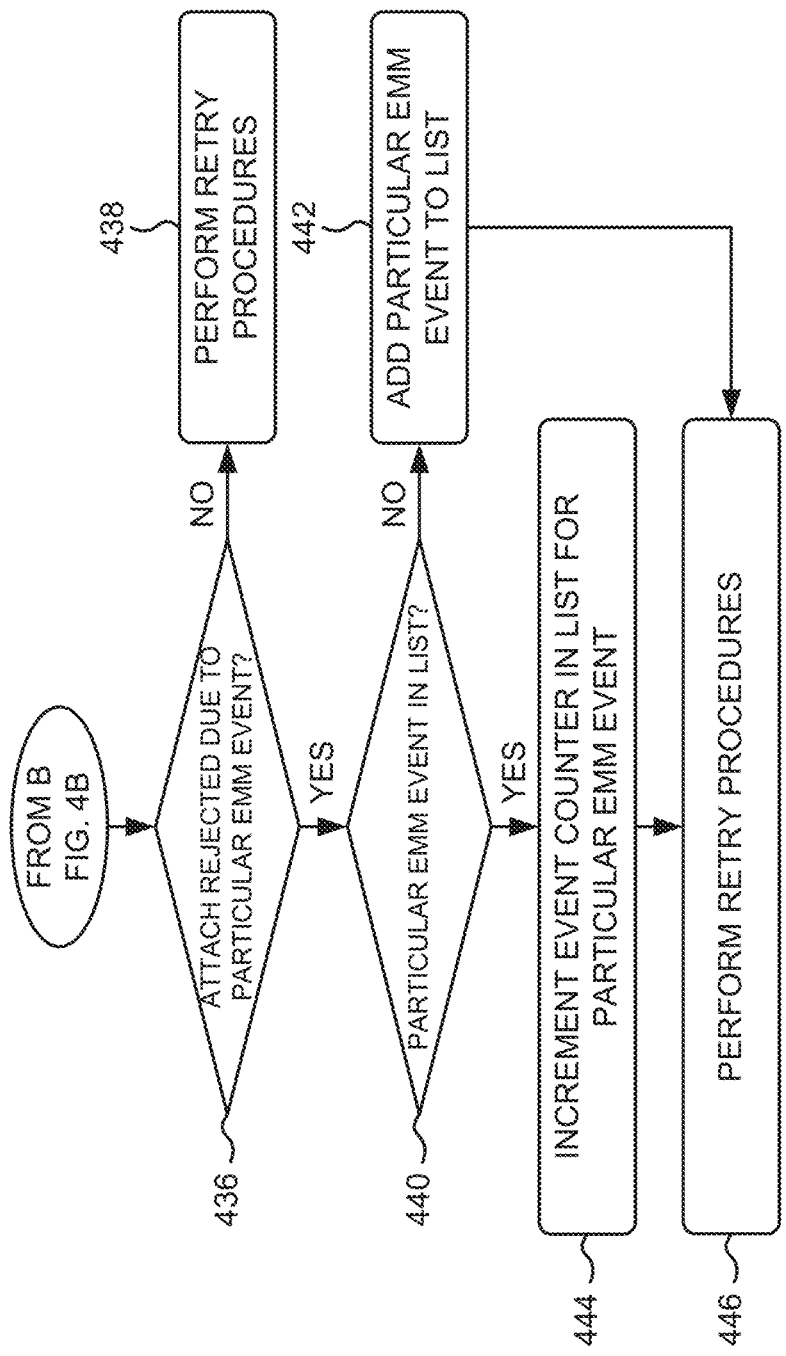

As shown in FIGS. 4B and 4C, if the attempt to attach to the particular PLMN in the particular tracking area is not successful (block 432—NO), process 400 may include determining whether the attempt to attach to the particular PLMN and tracking area is rejected due to a particular EMM failure event (block 436). For example, UE 210 may receive, from the particular PLMN in the particular tracking area, an attach reject message in response to the attach request message. When UE 210 receives the attach reject message, UE 210 may determine whether the attempt to attach to the particular PLMN in the particular tracking area is rejected due to a particular EMM failure event (e.g., an illegal UE, a forbidden PLMN, no suitable cells in tracking area, etc.). In some implementations, the attach reject message may include a reason for the rejection, such as a particular EMM failure event.

As further shown in FIG. 4C, if the attempt to attach to the particular PLMN and tracking area is not rejected due to a particular EMM failure event (block 436—NO), process 400 may include performing the retry procedures (block 438). For example, if UE 210 determines that the attempt to attach to the particular PLMN in the particular tracking area is not rejected due to a particular EMM failure event, UE 210 may perform the retry procedures. In some implementations, UE 210 may select another PLMN and/or another tracking area from the identified multiple access networks, and may perform the retry procedures with the other PLMN and/or the other tracking area.

As further shown in FIG. 4C, if the attempt to attach to the particular PLMN and tracking area is rejected due to a particular EMM failure event (block 436—YES), process 400 may include determining whether the particular EMM failure event is on the list of permanent EMM failure events (block 440). For example, if UE 210 determines that the attempt to attach to the particular PLMN in the particular tracking area is rejected due to a particular EMM failure event, UE 210 may determine whether the particular EMM failure event is on the list of permanent EMM failure events and is associated with the particular PLMN and the particular tracking area. In some implementations, UE 210 may determine whether the particular EMM failure event is on the list of permanent EMM failure events by comparing an EMM failure cause code of the particular EMM failure event with the EMM failure cause codes provided in the list of permanent EMM failure events.

As further shown in FIG. 4C, if the particular EMM failure event is not on the list of permanent EMM failure events (block 440—NO), process 400 may include adding the particular EMM failure event to the list of permanent EMM failure events (block 442). For example, if UE 210 determines that the EMM failure cause code of the particular EMM failure event does not match the EMM failure cause codes provided in the list of permanent EMM failure events or is not associated with the particular PLMN in the particular tracking area, UE 210 may determine that the particular EMM failure event is not on the list of permanent EMM failure events. In some implementations, if UE 210 determines that the particular EMM failure event is not on the list of permanent EMM failure events, UE 210 may add the particular EMM failure event to the list of permanent EMM failure events.

As further shown in FIG. 4C, if the particular EMM failure event is on the list of permanent EMM failure events (block 440—YES), process 400 may include incrementing an event counter, for the particular EMM failure event, in the list of permanent EMM failure events (block 444). For example, if UE 210 determines that the EMM failure cause code of the particular EMM failure event matches an EMM failure cause code provided in the list of permanent EMM failure events and is associated with the particular PLMN and the particular tracking area, UE 210 may determine that the particular EMM failure event is on the list of permanent EMM failure events. In some implementations, if UE 210 determines that the particular EMM failure event is on the list of permanent EMM failure events, UE 210 may increment an event counter, for the particular EMM failure event, in the list of permanent EMM failure events.

As further shown in FIG. 4C, process 400 may include performing the retry procedures (block 446). For example, UE 210 may perform the retry procedures after adding the particular EMM failure event to the list of permanent EMM failure events or after incrementing the event counter, for the particular EMM failure event, in the list of permanent EMM failure events. In some implementations, UE 210 may select another PLMN and/or another tracking area from the identified multiple access networks, and may perform the retry procedures with the other PLMN and/or the other tracking area.

Figure 4D:
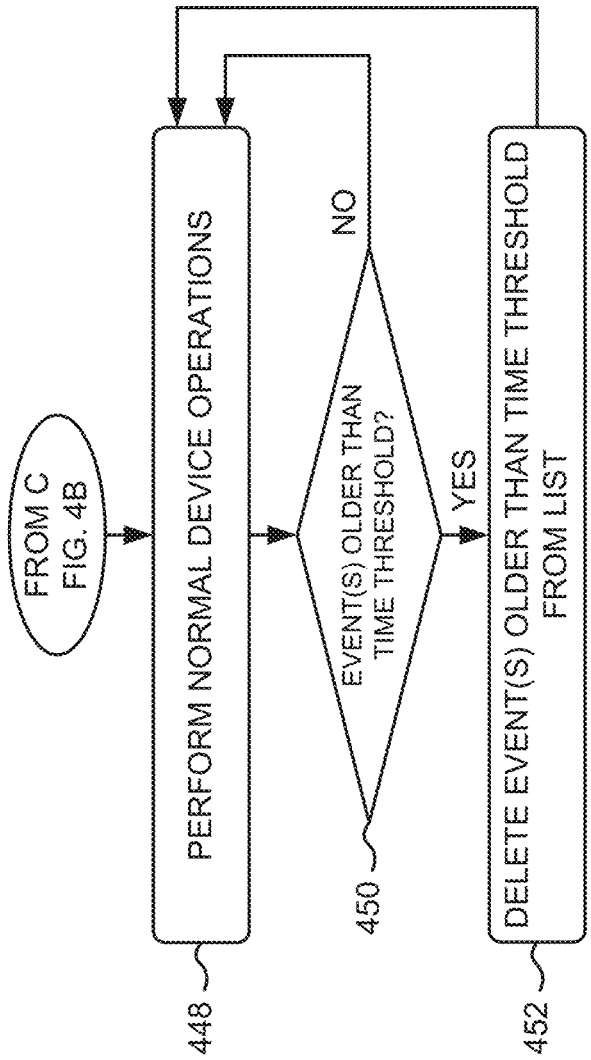

As shown in FIG. 4D, process 400 may include performing normal device operations (block 448). For example, UE 210 may receive, from the particular PLMN in the particular tracking area, an attach success message in response to the attach request message. When UE 210 receives the attach success message, UE 210 may attach to the particular PLMN in the particular tracking area. In some implementations, when UE 210 attaches to the particular PLMN and the particular tracking area, UE 210 may perform normal device operations (e.g., placing a call, connecting to a server, sending a text message, etc.) via the particular PLMN and the particular tracking area.

As further shown in FIG. 4D, process 400 may include determining whether any event(s) in the list of permanent EMM failure events are older than a time threshold (block 450). For example, while UE 210 performs the normal device operations, UE 210 may determine whether any events in the list of permanent EMM failure events are older than the time threshold. In some implementations, UE 210 may determine ages of the events in the list of permanent EMM failure events based on the date and time information associated with the events. UE 210 may compare the ages of the events to the time threshold when determining whether any of the events are older than the time threshold.

As further shown in FIG. 4D, if any event(s) in the list of permanent EMM failure events are older than the time threshold (block 450—YES), process 400 may include deleting the event(s) that are older than the time threshold (block 452). For example, when UE 210 determines that one or more events in the list of permanent EMM failure events are older than the time threshold, UE 210 may delete the one or more events from the list.

In some implementations, UE 210 may delete other events from the list of permanent EMM failure events regardless of whether the other events are older than the time threshold. For example, if UE successfully attaches to any LTE network, UE 210 may delete all events associated with a first set of EMM failure cause codes, such as EMM failure cause codes 3, 6, 7, an 8, from the list of permanent EMM failure events. If UE successfully attaches to the particular PLMN, UE 210 may delete all events associated with a second set of EMM failure cause codes, such as EMM failure cause codes 11 and 14, for the particular PLMN, from the list of permanent EMM failure events. If UE successfully attaches to the particular PLMN while in the particular tracking area, UE 210 may delete all events associated with a third set of EMM failure cause codes, such as EMM failure cause codes 12, 13, and 15, for the particular PLMN and the particular tracking area, from the list of permanent EMM failure events.

As further shown in FIG. 4D, if particular event(s) in the list of permanent EMM failure events are not older than the time threshold (block 450—NO), process 400 may include performing normal device operations (block 448). For example, if UE 210 determines that none of events in the list of permanent EMM failure events are older than the time threshold, UE 210 may perform normal device operations via the particular PLMN and the particular tracking area.

Although FIGS. 4A-4D show example blocks of process 400, in some implementations, process 400 may include additional blocks, fewer blocks, different blocks, or differently arranged blocks than those depicted in FIGS. 4A-4D. Additionally, or alternatively, two or more of the blocks of process 400 may be performed in parallel.

Figure 5B:
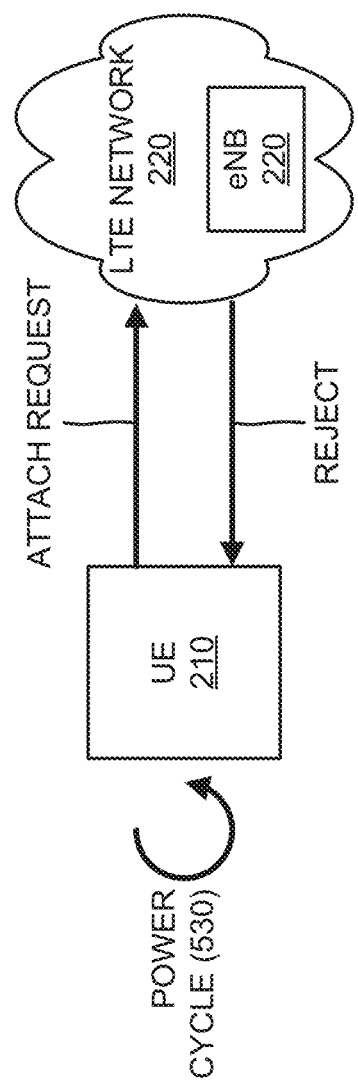

FIGS. 5A-5I are diagrams of an example 500 relating to example process 400 shown in FIGS. 4A-4D. In example 500, assume that UE 210 maintains a forbidden PLMN list 505, a forbidden TA list 510, a T3402 timer 515, an excessive PDN timer 520, and a list 525 of permanent EMM failure events, as shown in FIG. 5A. Forbidden PLMN list 505 may include a list of PLMNs (e.g., RANs, such as LTE network 220) to which UE 210 is not permitted to connect. Forbidden TA list 510 may include a list of TAs to which UE 210 is not permitted to connect. T3402 timer may include a retry throttling timer that prevents UE 210 from sending excessive TA attach requests to particular TA(s). Excessive PDN timer 520 may include a retry throttling timer that prevents UE 210 from sending excessive PDN connection requests to particular PDN(s).

List 525 may include a list of permanent EMM failure events associated with UE 210, PLMNs, TAs, etc. For example, the permanent EMM failure events may be due to an illegal UE, a forbidden PLMN, a forbidden TA, no roaming being permitted in a TA, no EPS services being permitted in a PLMN, etc. As shown in FIG. 5A, list 525 may include a date and time field, an EMM code field, a PLMN ID field, a TA field, an event counter field, and a variety of entries associated with the fields. The date and time field may include dates and times associated with the permanent EMM failure events. The EMM code field may include permanent EMM failure cause codes (e.g., 3, 6, 7, 8, etc.) for the permanent EMM failure events. The PLMN ID field may include PLMN identifiers associated with the permanent EMM failure events. The TA field may include TA identifiers associated with the permanent EMM failure events. The event counter field may include a counter for a number of occurrences associated with each permanent EMM failure event.

Figure 5C:
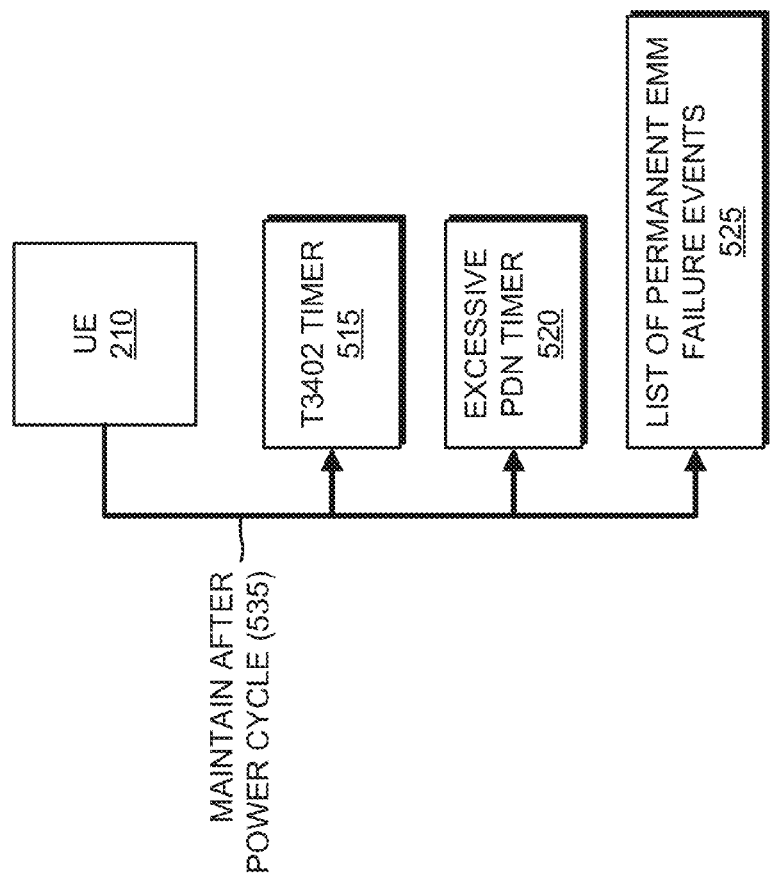
Figure 5E:
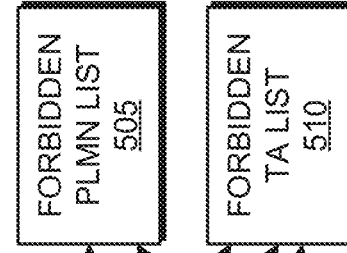

As shown in FIG. 5B, assume that UE 210 attempts to connect to a PLMN (e.g., LTE network 220) by providing an attach request to LTE network 220. Further, assume that UE 210 is denied the connection to the LTE network due to a reject message, such as an attach reject message, a tracking area update reject message, a service reject message, a detach request, etc. When UE 210 receives the reject message or when triggered by a host or application, UE 210 may power cycle as indicated by reference number 530, which may cause UE 210 to erase forbidden PLMN list 505 and forbidden TA list 510. As shown in FIG. 5C, after UE 210 performs power cycle 530, UE 210 may maintain the T3402 timer 515, excessive PDN timer 520, and list 525, as indicated by reference number 535.

As shown in FIG. 5D, UE 210 may determine whether any of the permanent EMM failure events in list 525 are older than a time threshold (e.g., two hours), as indicated by reference number 540. In example 500, assume that a current time is 2:00 PM on Jan. 1, 2013 and that UE 210 deletes the first four permanent EMM failure events provided in list 525, as further shown in FIG. 5D. UE 210 may delete the first four permanent EMM failure events in list 525 since the first four permanent EMM failure events occurred more than two hours before the current time.

In example 500, now assume that none of the permanent EMM failure events in list 525 are older than two hours. With this assumption, UE 210 may determine whether event counters associated with the permanent EMM failure events in list 525 are greater than or equal to a counter threshold (e.g., three), as indicated by reference number 545 in FIG. 5E. In example 500, assume that UE 210 determines that there are event counters for the permanent EMM failure events in list 525 that are greater than or equal to three. With this assumption, UE 210 may declare the USIM of UE 210 invalid for permanent EMM failure events associated with EMM failure cause codes associated with UE 210, such as EMM failure cause codes 3, 6, 7, or 8, as further shown in FIG. 5E. As further shown, UE 210 may add information associated with particular PLMNs (e.g., PLMNs with PLMN IDs 839248 and 243568), to forbidden PLMN list 505, for permanent EMM failure events associated with EMM failure cause codes associated with PLMNs, such as EMM failure cause codes 11 or 14. As further shown, UE 210 may add information associated with particular tracking areas (e.g., tracking areas TA5, TA7, and TA8), to forbidden TA list 510, for permanent EMM failure events associated with EMM failure cause codes associated with tracking areas, such EMM failure cause codes 12, 13, or 15.

Figure 5F:
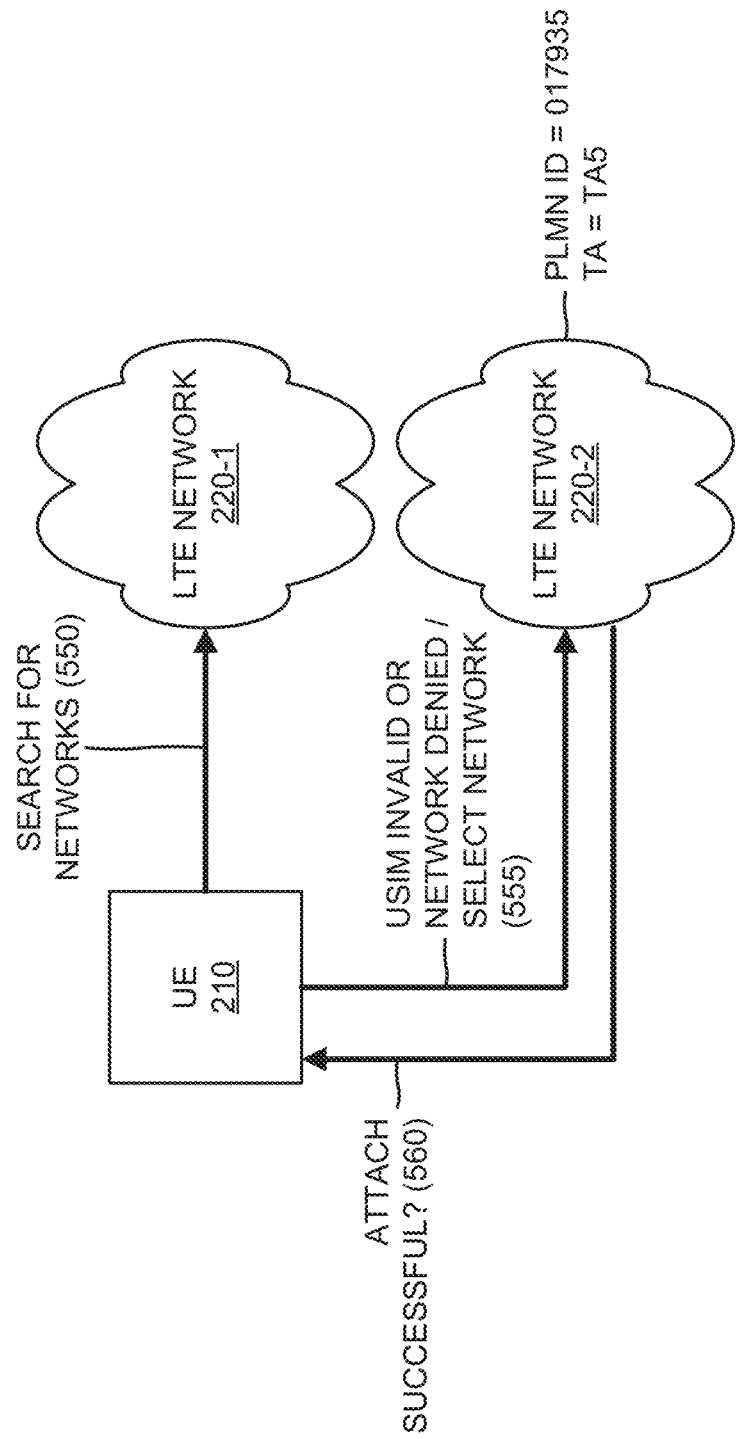

As shown in FIG. 5F, assume that UE 210 searches for access networks to which to attach, as indicated by reference number 550, and discovers LTE network 220-1 and LTE network 220-2 based on the search. In example 500, assume that UE 210 attempts to attach to LTE network 220-1 and is unable to attach to LTE network 220-1 based on the USIM of UE 210 being invalid or because LTE network 220-1 denies access, as indicated by reference number 555. In some implementations, UE 210 may not attempt to attach to any LTE network or any legacy 3GPP network (e.g., HSPA, UMTS, GSM, etc.) if the USIM is invalid. Further, assume that UE 210 attempts to attach to LTE network 220-2 after being unable to attach to LTE network 220-1. As further shown, LTE network 220-1 may be associated with a PLMN ID of 017935 and a tracking area of TA5. UE 210 may determine whether the attempt to attach to LTE network 220-2 is successful, as indicated by reference number 560 in FIG. 5F.

If the attempt to attach to LTE network 220-2 is successful, UE 210 may delete, from list 525, permanent EMM failure events that are associated with PLMN ID 017935 and tracking area TA5, as indicated by reference number 565 in FIG. 5G. As further shown in FIG. 5G, UE 210 may delete the last three permanent EMM failure events from list 525 since these events are associated with PLMN ID 017935 and tracking area TA5. If the attempt to attach to LTE network 220-2 is successful, UE 210 may perform device operations, such as, for example, placing a telephone call, sending a text message, etc. If the attempt to attach to LTE network 220-2 is successful, UE 210 may determine whether any of the permanent EMM failure events in list 525 are older than the time threshold (e.g., two hours), as indicated by reference number 570 in FIG. 5H. Since the current time is 2:00 PM on Jan. 1, 2013, UE 210 may delete the first four permanent EMM failure events provided in list 525, as further shown in FIG. 5H. UE 210 may delete the first four permanent EMM failure events in list 525 since the first four permanent EMM failure events occurred more than two hours before the current time.

If the attempt to attach to LTE network 220-2 is unsuccessful, UE 210 may determine whether the attempt to attach to LTE network 220-2 is unsuccessful due to a particular EMM failure event. If UE 210 determines that the attempt to attach to LTE network 220-2 is not unsuccessful due to a particular EMM failure event, UE 210 may select another LTE network, and may perform the retry procedures with the other LTE network (e.g., if the USIM is not invalid).

If UE 210 determines that the attempt to attach to LTE network 220-2 is unsuccessful due to a particular EMM failure event, UE 210 may determine whether the particular EMM failure event is on list 525 by comparing an EMM failure cause code of the particular EMM failure event with the EMM failure cause codes provided in list 525 and associated with a particular PLMN and tracking area. If UE 210 determines that the EMM failure cause code of the particular EMM failure event does not match the EMM failure cause codes provided in list 525, UE 210 may determine that the particular EMM failure event is not on list 525. In such circumstances, UE 210 may add the particular EMM failure event to list 525, as indicated by reference number 575 in FIG. 5I.

If UE 210 determines that the EMM failure cause code of the particular EMM failure event matches an EMM failure cause code provided in list 525, UE 210 may determine that the particular EMM failure event is on list 525. In such circumstances, UE 210 may increment an event counter, for the particular EMM failure event, in list 525, as further indicated by reference number 575 in FIG. 5I. For example, assume that the particular EMM failure event is associated with EMM failure cause code 13. In this example, UE 210 may increase the event counter from "2" to "3" for the particular EMM failure event in list 525, as shown in highlight in FIG. 5I.

As indicated above, FIGS. 5A-5I are provided merely as an example. Other examples are possible and may differ from what was described with regard to FIGS. 5A-5I.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
   creating, by a device, a list of permanent evolved packet system (EPS) mobility management (EMM) failure events associated with the device,
      the list including information associated with a plurality of permanent EMM failure events possibly encountered by the device at a future time,
         the plurality of permanent EMM failure events including at least:
            a permanent EMM failure event due to the device being illegal,
            a permanent EMM failure event associated with no roaming being permitted in a particular tracking area, and
            a permanent EMM failure event associated with no EPS services being permitted in a particular public land mobile network (PLMN);
   storing, by the device, the list of permanent EMM failure events;
   providing, by the device, an attach request message to an access network;
   receiving, by the device and from the access network, a reject message as a response to the attach request message;
   performing, by the device, a power cycle based on receiving the reject message or when triggered by a host or an application;
   erasing, by the device and based on the power cycle, a forbidden PLMN list and a forbidden tracking area list maintained by the device;
   repopulating, by the device and after the power cycle, the forbidden PLMN list and the forbidden tracking area list, with the information associated with the list of permanent EMM failure events, to create a repopulated forbidden PLMN list and a repopulated forbidden tracking area list;

preventing, by the device, a reset of a plurality of retry throttling timers during the power cycle; and changing, by the device, a status of a universal subscriber identity module (USIM) of the device to an invalid state based on the list of permanent EMM failure events, the repopulating the forbidden PLMN list and the forbidden tracking area list, the preventing the reset of the plurality of retry throttling timers, and the changing the status of the USIM to the invalid state preventing the device from generating a particular number of attach request messages.

2. The method of claim 1, where the plurality of retry throttling timers includes a timer that prevents the device from sending requests associated with a tracking area.

3. The method of claim 1, where the plurality of retry throttling timers includes a timer that prevents the device from sending packet data network (PDN) connection requests.

4. The method of claim 1, further comprising:

determining whether one or more permanent EMM failure events, of the list of permanent EMM failure events, are older than a time threshold; and deleting, from the list of permanent EMM failure events, the one or more permanent EMM failure events that are older than the time threshold.

5. The method of claim 1, further comprising:

determining whether the plurality of permanent EMM failure events, of the list of permanent EMM failure events, includes counters greater than a counter threshold;

changing the status of the USIM of the device to the invalid state when a first set of the plurality of permanent EMM failure events includes counters greater than the counter threshold;

adding information associated with a PLMN to the forbidden PLMN list when a second set of the plurality of permanent EMM failure events includes counters greater than the counter threshold; and adding information associated with a tracking area to the forbidden tracking area list when a third set of the plurality of permanent EMM failure events includes counters greater than the counter threshold.

6. The method of claim 1, further comprising:

selecting an available PLMN in an available tracking area from available PLMNs and available tracking areas;

determining whether the available PLMN is on the forbidden PLMN list;

determining whether the available tracking area is on the forbidden tracking area list; and attempting to connect to the available PLMN and the available tracking area when the available PLMN is not on the forbidden PLMN list and when the available tracking area is not on the forbidden tracking area list.

7. The method of claim 6, further comprising:

connecting to the available PLMN and the available tracking area; and deleting, from the list of permanent EMM failure events, any of the plurality of permanent EMM failure events that are associated with the available PLMN in the available tracking area.

8. A device, comprising:

a memory to store a forbidden public land mobile network (PLMN) list and a forbidden tracking area list; and one or more processors to:

create a list of permanent evolved packet system (EPS) mobility management (EMM) failure events associated with the device, the list including information associated with a plurality of permanent EMM failure events possibly encountered by the device at a future time, the plurality of permanent EMM failure events including at least:

a permanent EMM failure event due to the device being illegal, a permanent EMM failure event associated with no roaming being permitted in a particular tracking area, and a permanent EMM failure event associated with no EPS services being permitted in a particular PLMN, store the list of permanent EMM failure events in the memory, provide an attempt to connect to an access network, receive, from the access network, a reject message as a response to the attempt to connect, perform a power cycle based on receiving the reject message or when triggered by a host or an application, erase, based on the power cycle, the forbidden PLMN list and the forbidden tracking area list, repopulate, prior to attempting to connect to another access network, the forbidden PLMN list and the forbidden tracking area list with the information associated with the list of permanent EMM failure events, to create a repopulated forbidden PLMN list and a repopulated forbidden tracking area list, prevent a reset of a plurality of retry throttling timers during the power cycle, and change a status of a universal subscriber identity module (USIM) of the device to an invalid state based on the list of permanent EMM failure events, the repopulating the forbidden PLMN list and the forbidden tracking area list, the preventing the reset of the plurality of retry throttling timers, and the changing the status of the USIM to the invalid state preventing the device from generating a particular number of attach request messages.

9. The device of claim 8, where the plurality of retry throttling timers includes a timer that prevents the device from sending requests associated with a tracking area.

10. The device of claim 8, where the plurality of retry throttling timers includes a timer that prevents the device from sending packet data network (PDN) connection requests.

11. The device of claim 8, where the one or more processors are further to:

determine whether one or more permanent EMM failure events, of the list of permanent EMM failure events, are older than a time threshold, and delete, from the list of permanent EMM failure events, the one or more permanent EMM failure events that are older than the time threshold.

12. The device of claim 8, where the one or more processors are further to:

determine whether the plurality of permanent EMM failure events, of the list of permanent EMM failure events, includes counters greater than a counter threshold, change the status of the USIM of the device to the invalid state when a first set of the plurality of permanent EMM failure events includes counters greater than the counter threshold, add information associated with a PLMN to the forbidden PLMN list when a second set of the plurality of permanent EMM failure events includes counters greater than the counter threshold, and add information associated with a tracking area to the forbidden tracking area list when a third set of the plurality of permanent EMM failure events includes counters greater than a counter threshold.

13. The device of claim 8, where the one or more processors are further to:

select an available PLMN in an available tracking area from PLMNs and tracking areas accessible to the device, determine whether the available PLMN is on the forbidden PLMN list, determine whether the available tracking area is on the forbidden tracking area list, and attempt to connect to the available PLMN and the available tracking area when the available PLMN is not on the forbidden PLMN list and when the available tracking area is not on the forbidden tracking area list.

14. The device of claim 13, where the one or more processors are further to:

receive an indication that the attempt to connect was rejected based on a particular permanent EMM failure event, determine whether the particular permanent EMM failure event is included in the list of permanent EMM failure events, add, to the list of permanent EMM failure events, information associated with the particular permanent EMM failure event when the particular permanent EMM failure event is not included in the list of permanent EMM failure events, and increment, in the list of permanent EMM failure events, a counter associated with the particular permanent EMM failure event when the particular permanent EMM failure event is included in the list of permanent EMM failure events.

15. A non-transitory computer-readable medium for storing instructions, the instructions comprising:

one or more instructions that, when executed by one or more processors of a device, cause the one or more processors to:

create a list of permanent evolved packet system (EPS) mobility management (EMM) failure events associated with the device, the list including information associated with a plurality of permanent EMM failure events possibly encountered by the device at a future time, the plurality of permanent EMM failure events including at least:

a permanent EMM failure event due to the device being illegal, a permanent EMM failure event associated with no roaming being permitted in a particular tracking area, and a permanent EMM failure event associated with no EPS services being permitted in a particular public land mobile network (PLMN), store the list of permanent EMM failure events, provide an attempt to connect to an access network, receive, from the access network, a reject message as a response to the attempt to connect, perform a power cycle for the device based on receiving the reject message or when triggered by a host or an application, delete, after the power cycle, information included in a forbidden PLMN list and a forbidden tracking area list maintained by the device, repopulate the forbidden PLMN list and the forbidden tracking area list with the information associated with the list of permanent EMM failure events, to create a repopulated forbidden PLMN list and a repopulated forbidden tracking area list, prevent a reset of a plurality of retry throttling timers during the power cycle, and change a status of a universal subscriber identity module (USIM) of the device to an invalid state based on the list of permanent EMM failure events, the repopulating the forbidden PLMN list and the forbidden tracking area list, the preventing the reset of the plurality of retry throttling timers, and the changing the status of the USIM to the invalid state preventing the device from generating a particular number of attach request messages.

16. The computer-readable medium of claim 15, where the plurality of retry throttling timers includes a first retry throttling timer that prevents the device from sending requests associated with a tracking area, and a second retry throttling timer that prevents the device from sending packet data network (PDN) connection requests.

17. The computer-readable medium of claim 15, where the instructions further comprise:

one or more instructions that, when executed by the one or more processors, cause the one or more processors to:

determine whether one or more permanent EMM failure events, of the list of permanent EMM failure events, are older than a time threshold, and delete, from the list of permanent EMM failure events, the one or more permanent EMM failure events that are older than the time threshold.

18. The computer-readable medium of claim 15, where the instructions further comprise:

one or more instructions that, when executed by the one or more processors, cause the one or more processors to:

determine whether the plurality of permanent EMM failure events, of the list of permanent EMM failure events, includes counters greater than a counter threshold, change the status of the USIM of the device to the invalid state when a first set of the plurality of permanent EMM failure events includes counters greater than the counter threshold, add information associated with a PLMN to the forbidden PLMN list when a second set of the plurality of permanent EMM failure events includes counters greater than the counter threshold, and add information associated with a tracking area to the forbidden tracking area list when a third set of the plurality of permanent EMM failure events includes counters greater than the counter threshold.

19. The computer-readable medium of claim 15, where the instructions further comprise:

one or more instructions that, when executed by the one or more processors, cause the one or more processors to:

select an available PLMN in an available tracking area from available PLMNs and available tracking areas, determine whether the available PLMN is on the forbidden PLMN list, determine whether the available tracking area is on the forbidden tracking area list, and attempt to connect to the available PLMN and the available tracking area when the available PLMN is not on the forbidden PLMN list and when the available tracking area is not on the forbidden tracking area list.

20. The computer-readable medium of claim 19, where the instructions further comprise:

one or more instructions that, when executed by the one or more processors, cause the one or more processors to:

connect to the available PLMN and the available tracking area, and delete, from the list of permanent EMM failure events, any of the plurality of permanent EMM failure events that are associated with the available PLMN in the available tracking area.

* * * * *